United States Patent [19]
Ayers et al.

[11] 3,845,537
[45] Nov. 5, 1974

[54] ASSEMBLY APPARATUS

[75] Inventors: Clifton E. Ayers, New Whiteland; Walter G. Herreman, Indianapolis, both of Ind.

[73] Assignee: P. R. Mallory & Co. Inc., Indianapolis, Ind.

[22] Filed: Oct. 19, 1973

[21] Appl. No.: 407,927

[52] U.S. Cl. .............................. 29/208 F
[51] Int. Cl. .......................... B23p 19/04
[58] Field of Search .......... 29/208 F, 208 E, 208 R, 29/211 R

[56] References Cited
UNITED STATES PATENTS
1,941,992  1/1934  Makenny .......................... 29/208 F
2,237,359  4/1941  Ott .................................. 29/208 F

*Primary Examiner*—Thomas H. Eager
*Attorney, Agent, or Firm*—Charles W. Hoffmann; Robert F. Meyer

[57] ABSTRACT

An assembly apparatus includes two counter-rotating drums each loaded with components to be assembled together. An ejection means carried by one of the drums urges components from that drum into assembly with components on the other drum.

7 Claims, 4 Drawing Figures

ASSEMBLY APPARATUS

Generally speaking, the present invention relates to an assembly apparatus including a first rotating drum, a plurality of nests in the outer periphery of the first drum, a first loading means for loading each of the first nests with a first component of assembly, a first retention means for retaining the first components of assembly in the first nests, a second drum rotating in close proximity to and in an opposite direction to the first drum and about an axis substantially parallel to the rotational axis of the first drum, a second plurality of nests in the outer periphery of the second drum, a second loading means for loading each of the second nests with a second component of assembly, second retention means for retaining the second components of assembly in the second nests, ejection means for urging one of the second components of assembly from one nest in the second drum into assembly with one of the first components of assembly retained in a nest in the first drum, a housing in which the first and second drums are journaled for rotation, and drive means for rotating the first and second drums.

The present invention more specifically relates to an assembly apparatus to insert metal C-rings into plastic caps. Eventually, the completed assemblies are inserted into primary voltage cells. Prior to the present invention, assemblies of this type were made on a manually-loaded indexing table requiring three persons to operate it. The output production was, at most, 150 assembled units per minute. The present assembly apparatus produces about 240 assembled units per minute, and three such apparatus may be attended by one person. The assembly apparatus may be used to assemble many different components, and is by no means limited to the C-ring and cap assemblies in the embodiment herein described and illustrated.

Accordingly, a feature of the present invention is to provide an assembly apparatus that assembles one component with another. Another feature of the present invention is to provide an assembly apparatus that assembles a metal C-ring into a plastic top for primary voltage cell. Still another feature of the present invention is to provide an assembly apparatus that includes two counter rotating drums, each loaded with a plurality of components, and an ejection means for urging one component of one drum into assembly with one component of the other drum.

These and other features will become more apparent from the following description taken in conjunction with the accompanying drawings wherein.

Figure 1:
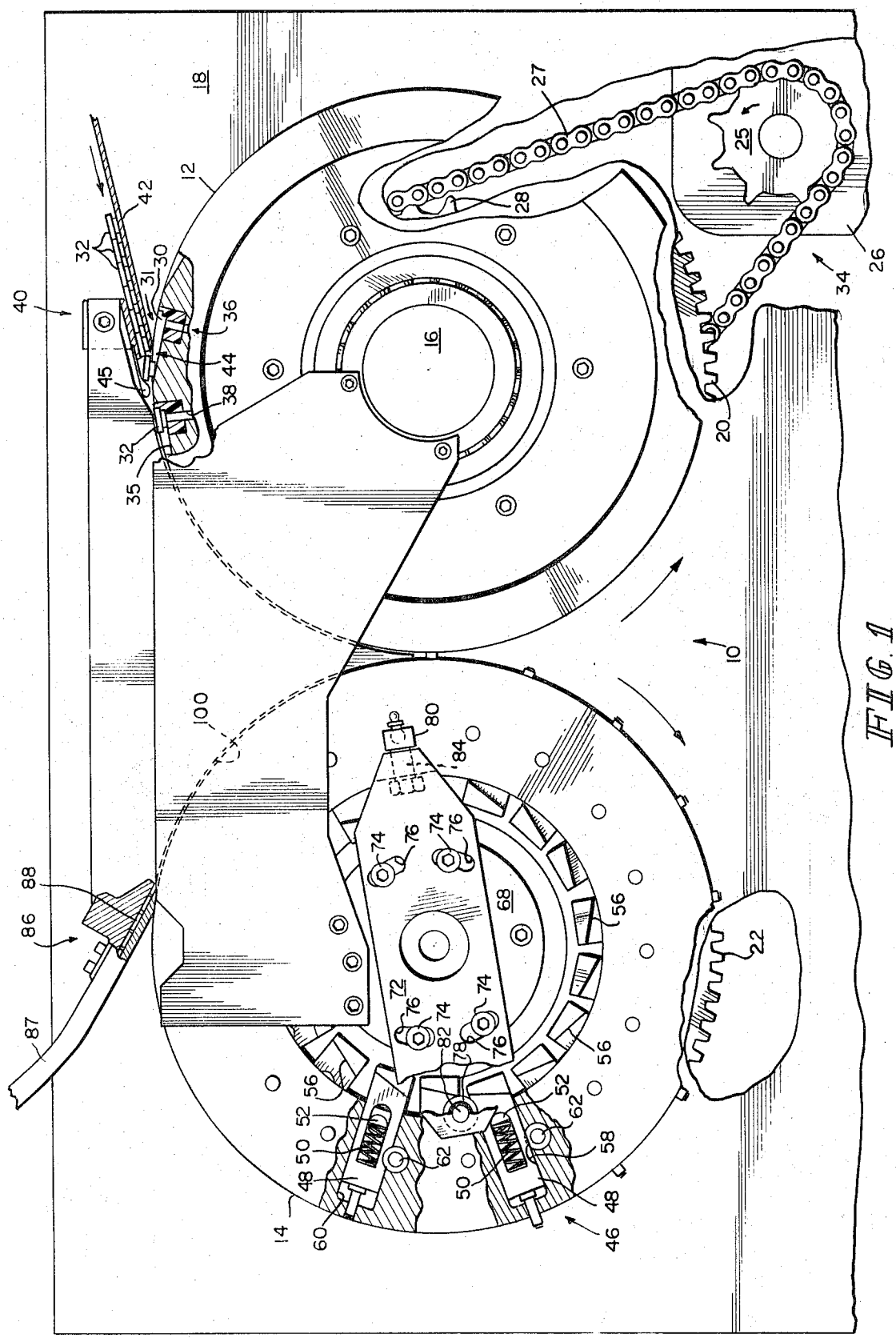
FIG. 1 is a front view of the assembly apparatus.

Referring now to FIG. 1, an assembly apparatus 10 is illustrated including a first drum 12 and a second drum 14. Drums 12 and 14 are rotatable about substantially parallel and horizontal axes. First drum 12 is rotatably carried on one end of a first shaft 16 rigidly connected to a housing 18. A first gear 20 is connected to first drum 12. Second drum 14 is rotatably carried on one end of a second shaft 21 rigidly connected to housing 18. A second gear 22 is connected to second drum 14 and is in engagement with first gear 20. First and second gears 20 and 22 include the same number of gear teeth so that first and second drums 12 and 14 can rotate at the same speed although in opposite directions. A drive means 34 comprising an electric motor 26, is coupled to first drum 12 through a driver sprocket 25, a chain 27, and a driven sprocket 28 connected to first drum 12.

First drum 12 includes a plurality of nests 30 in its outer periphery. Each nest 30 is a cavity 31 shaped to accept and orient a first component of assembly 32. In the illustrated embodiment in FIG. 1, nests 30 are substantially cylindrical in shape and spaced about 20° apart around the entire periphery of first drum 12. Each nest 30 includes a lead-in surface 35 to facilitate loading of components 32 in the nests. First drum 12 further includes a first retention means 36 for retaining components 32 in nests 30. Retention means 36 comprises at least one hole 38 in each nest 32 through which a vacuum is produced. The holes 38 lead to a vacuum pump (not shown).

First components of assembly 32 are loaded into nests 30 by a first loading means 40. First loading means 40 includes a first feeder chute 42 carried on housing 18 and having an open end 44 near the outer periphery of first drum 12. First loading means 40 further includes a leaf spring 45 disposed near open end 44 capable of urging components carrying down chute 42 into lead-in surfaces 34 and nests 30.

Figure 2:
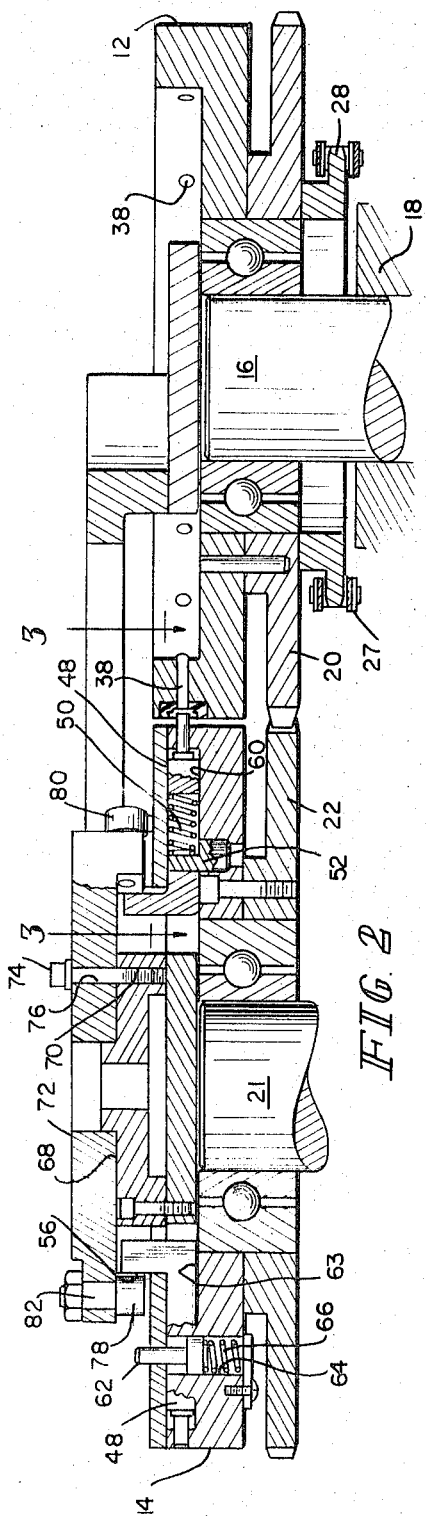
FIG. 2 is a sectional bottom view of the assembly apparatus.

An ejection means 46, carried on second drum 14 includes a plurality of plungers 48, first compression spring 50, latching pins 62, second compression spring 66, and backing post 52. Each plunger 48 is spring-loaded against first compression spring 50. Spring 50 contacts plunger 48 and backing post 52 which is rigidly carried by drum 14. Spring 50 and backing post 52 are disposed in a slot 54 in each of plungers 48. Plungers 48 each include a ramped surface 56 and a locking notch 58. Each of plungers 48 is capable of translational motion along guides 60 extending radially on drum 14. A plurality of latching pins 62 extend from a surface 63 of drum 14, and each pin engages a plunger 48 at locking notch 58. Referring now to FIGS. 1 and 2 each latching pin 62 is loaded in an aperture 64 against second compression spring 66. Plungers 48 are disposed about 20° apart around the entire periphery of second drum 14. The outside diameters of the two drums 12 and 14 are substantially equal and are geared together so that every nest 30 of first drum 12 lines up with a plunger 48 of second drum 14 along a horizontal line between the centers of the drums as the drums counter rotate together.

Ejection means 46 further includes a hub 68, on arm 72, a cocking roller 78 and a firing roller 80. Hub 68 is rigidly connected to second shaft 21 and includes a plurality of threaded holes 70. Arm 72, is attached with bolts 74 to hub 68 through arcuate slots 76 in the arm. Slots 76 provide for small angular adjustment of arm 72 in relation to housing 18. Arm 72 includes cocking roller 78 and firing roller 80. Cocking roller 78 rotates about a first roller post 82 extending from arm 72 and can engage the ramped surface 56 on each plunger 48 as drum 14 rotates. The axis of rotation of roller 78 is substantially parallel to the axis of rotation of second drum 14. Firing roller 80 rotates about a second roller post 84 extending from arm 72 and can engage each latching pin 62 as drum 14 rotates. The axis of rotation of roller 80 is substantially perpendicular to the axis of rotation of second drum 14.

Figure 4:
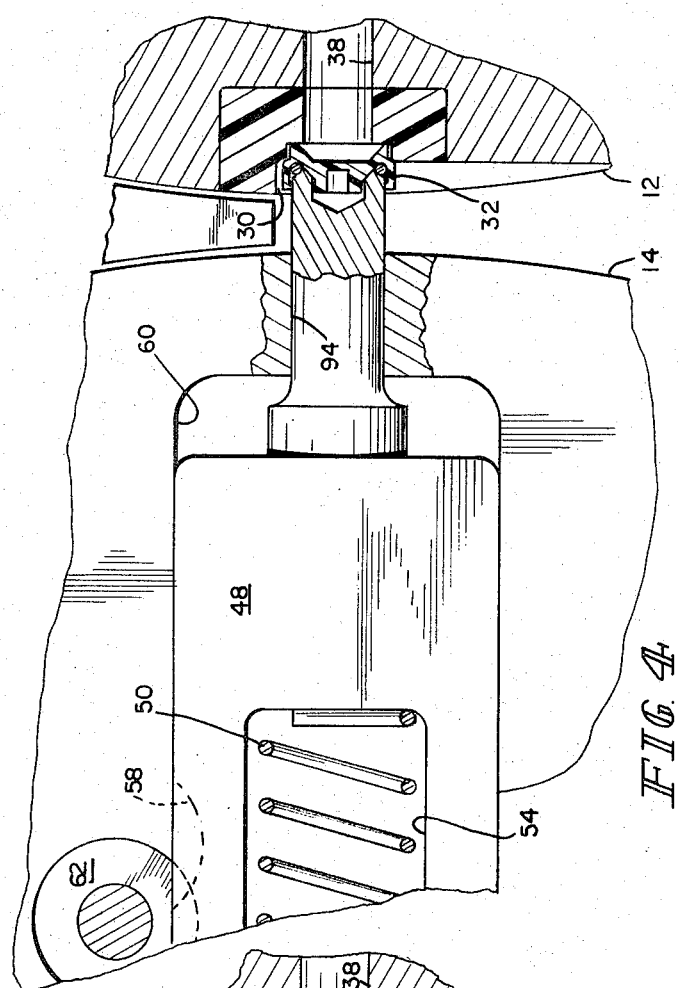
FIG. 4 is the same view as FIG. 3 but just subsequent to assembly of the two components.
Figure 3:
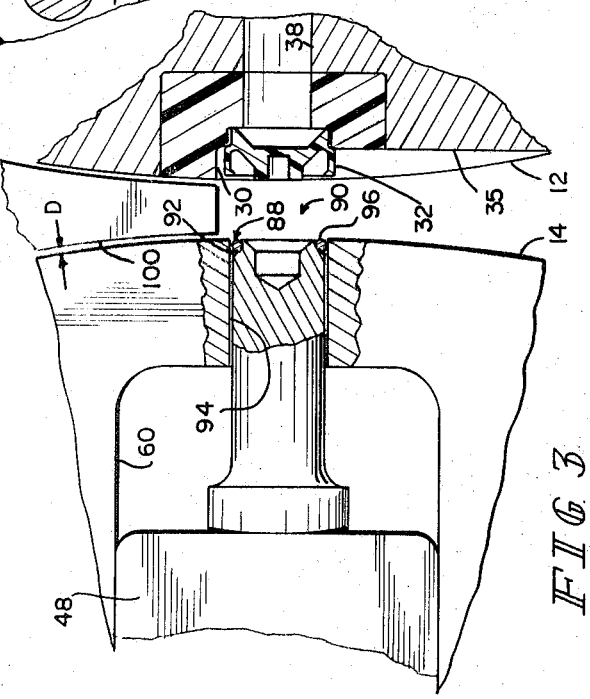
FIG. 3 is a partial section view of a first component in a nest of a first drum and a second component in a nest of a second drum immediately prior to assembly of the two components.

A second loading means 86 provides second components of assembly 88 to second drum 14. A plunger tip 90 on each plunger 48 is shaped to form a second nest 92 in conjunction with an aperture 94 through which the plunger tip is cocked. As is shown in FIGS. 3 and 4, second nest 92 can accept and align a C-ring 96, which in this case is the second component of assembly 88. Second loading means 86 includes a second feeder chute 87 down which second components of assembly 88 are gravity fed from a second component hopper (not shown).

A second retention means 98 includes a shroud 100 carried by housing 18 disposed in close proximity to the outer periphery of second drum 14 from a point where second components are picked up from chute 87 by drum 14 to a point just short of a center line between the centers of drums 12 and 14. The distance D between shroud 100 and second drum 14 is less than the thickness of second component 88. Therefore, the components 88 are retained in second nests 92 from the point where they are loaded into drum 14 to a point near the center line between drums 12 and 14.

In operation, motor 26 drives first drum 12 through sprockets 25 and 28 and chain 27. First drum 12 is rotated counterclockwise as viewed in FIG. 1. First gear 20 carried on first drum 12 engages and drives second gear 22 on second drum 14, so that second drum 14 rotates clockwise and at the same speed as first drum 12.

As second drum 14 rotates, each of plungers 48 is cocked against the force its compression spring 50 by the camming action of cocking roller 78 against its ramped surface 56. Upon each plunger 48 being ramped to its cocked position as it passes cocking roller 78, locking notch 58 on each plunger 48 is aligned with the latching pin 62 for that plunger, whereupon compression spring 66 forces the latching pin out into the notch. Each of latching pins 62 retains one plunger 48 against the compressive force of its spring 50 after cocking roller 78 is no longer in contact with ramp surface 56. Upon rotating clockwise to the point where second components 88 are provided at the open end of chute 87, cocked plungers pick up the components in second nests 92 at plunger tips 90.

As the plungers 48 rotate cockwise, components 88 are prevented from falling out of nests 92 by shroud 100.

First drum 12 rotates counterclockwise. First components of assembly 32 travel down chute 42 and each is picked up by a lead-in surface 34. Leaf spring 45 urges each component 32 into nest 30, whereupon a vacuum produced in each of tubes 38 retains the components from falling out of the nests.

As drums 12 and 14 rotate each of plunger tips 90 in drum 14 align with a nest 30 in drum 12 along a line between the centers of both drums. At that point of alignment, firing roller 80 rolls across and depresses latching pin 62 against the compressive force of second spring 66. As pin 62 is depressed back into aperture 64 in drum 14, it disengages locking notch 58 on plunger 48 and allows the plunger to "fire" under the force exerted by spring 50. The "fired" plunger 48, carrying a second component 88 on its tip 90, moves substantially along a horizontal line between the centers of drums 12 and 14 and drives one second component 88 into one first component 32 in nest 30 in drum 12. As the wheels continue to counter rotate, plunger 48, now in its completely fired position is pulled away from nest 30. The vacuum produced in tubes 38 is cut-off below the horizontal line between the two drums 12 and 14, so that assemblies of components 88 and 32 can fall out of nests 30 into a collection bin (not shown). As the wheels continue to rotate, plungers 48 are, again, cocked and components 32 and 88 are loaded onto the drums as before. The assembly is continuous, and the illustrated embodiment can produce up to about 240 assembled units per minute.

What is claimed is:

1. An assembly apparatus, comprising:
   a. a housing;
   b. a first rotating drum journaled for rotation in said housing;
   c. a first plurality of nests in an outer periphery of said first rotating drum;
   d. a first loading means for loading each of said first nests with a component of assembly;
   e. first retention means carried by said first rotating drum for retaining said first components of assembly in said first nests;
   f. a second drum journalled in said housing and rotating in close proximity to and in an opposite direction to said first drum and about an axis substantially parallel to the rotational axis of said first rotation drum;
   g. a second plurality of nests in an outer periphery of said second rotating drum;
   h. second loading means for loading each of said second nests with a second component of assembly;
   i. second retention means for retaining said second components of assembly in said second nests;
   j. ejection means for urging a second assembly component from a nest in said second drum into assembly with a first assembly component retained in a nest in said first rotating drum; and
   k. a drive means connected to and rotating said first and second rotating drums.

2. The assembly apparatus as recited in claim 1 wherein said first loading means comprises a first feeder chute carried on said housing with an open end in close proximity to the outer periphery of said first drum, said first components of assembly capable of sliding down said first feeder chute and into contact with said first nests on said first drum.

3. The assembly apparatus as recited in claim 2 wherein said first loading means further includes a leaf spring member carried by said first feeder chute near said open end to urge said first components of assembly into place in said first nests.

4. The assembly apparatus according to claim 1 wherein said first retention means comprises apertures in said first nests through which a vacuum is produced thereby retaining said first components in said nests.

5. The assembly apparatus according to claim 1 wherein said second loading means comprises a second feeder chute carried by said housing including an open end in close proximity to the outer periphery of said second rotating drum, said second components of assembly capable of sliding down said second feeder chute and into contact with said second nests of said second rotating drum.

6. The assembly appartus as recited in claim 1 wherein said second retention means comprises a shroud carried by said housing and covering a portion of the outer periphery of said second rotating drum to retain said second components of assembly in said nests until they are ejected.

7. The assembly apparatus as recited in claim 1 wherein said ejection means comprises:
   a. a plurality of plungers carried on said second rotating drum;
   b. a plurality of compression springs each contacting at one end one of said plungers and, at another end, one of a plurality of backing posts extending from said second drum;
   c. a ramped surface carried by each of said plungers;
   d. a cocking roller carried on said housing engaging said ramped surfaces to load each of said plungers against said compression springs;
   e. a plurality of latching pins engaging and restraining said loaded plungers against the force of said compression springs; and
   f. a firing roller carried on said housing engaging said latching pins to release said plungers, one at a time, allowing said plungers to move under the influence of said compression springs toward said first nests in said first rotating drum.

* * * * *